US007730397B2

(12) United States Patent
Tischer (10) Patent No.: US 7,730,397 B2
(45) Date of Patent: Jun. 1, 2010

(54) SYSTEM AND METHOD FOR RAPID PRESENTATION OF STRUCTURED DIGITAL CONTENT ITEMS (75) Inventor: Steven Neil Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 11 days.

(21) Appl. No.: 12/176,499

(22) Filed: Jul. 21, 2008

(65) Prior Publication Data

US 2009/0007005 A1    Jan. 1, 2009

Related U.S. Application Data (63) Continuation of application No. 09/895,989, filed on Jun. 29, 2001, now Pat. No. 7,404,142.

(51) Int. Cl.
*G06F 17/00* (2006.01)
(52) U.S. Cl. .................................. 715/247; 715/246
(58) Field of Classification Search .......... 715/200, 715/205, 206, 234, 246, 247
See application file for complete search history.

(56) References Cited

U.S. PATENT DOCUMENTS

| 6,397,212 | B1 * | 5/2002 | Biffar ............................ 707/5 |
| 6,510,406 | B1 * | 1/2003 | Marchisio ...................... 704/9 |
| 6,636,854 | B2 * | 10/2003 | Dutta et al. .................... 707/10 |
| 6,647,389 | B1 * | 11/2003 | Fitch et al. .................... 707/10 |
| 6,691,108 | B2 * | 2/2004 | Li ................................ 707/3 |
| 6,721,736 | B1 * | 4/2004 | Krug et al. ..................... 707/5 |
| 6,745,161 | B1 * | 6/2004 | Arnold et al. .................. 704/7 |
| 2002/0073115 | A1 * | 6/2002 | Davis ...................... 707/500.1 |
| 2002/0161747 | A1 * | 10/2002 | Li et al. ......................... 707/3 |
| 2003/0208690 | A1 * | 11/2003 | Aull ........................... 713/201 |

\* cited by examiner

*Primary Examiner*—Stephen S Hong
*Assistant Examiner*—Gregory J Vaughn
(74) *Attorney, Agent, or Firm*—Scott P. Zimmerman PLLC (57) ABSTRACT Methods, systems, and products are disclosed for presenting structured digital content items. A file is read that defines a hierarchical structure. A display region is divided into regions and each region is mapped to a category within the hierarchical structure. An x-coordinate and a y-coordinate, corresponding to a location on the display, are received. The category that maps to the x-coordinate and the y-coordinate is displayed.

19 Claims, 4 Drawing Sheets

SYSTEM AND METHOD FOR RAPID PRESENTATION OF STRUCTURED DIGITAL CONTENT ITEMS

CROSS-REFERENCE TO RELATED APPLICATIONS

This application is a continuation of U.S. application Ser. No. 09/895,989, filed Jun. 29, 2001, now issued as U.S. Pat. No. 7,404,142, and incorporated herein by reference in its entirety.

FIELD OF THE INVENTION

The present invention generally relates to the field of computer software. More particularly, the present invention relates to computer software for rapid presentation of digital content items that can be arranged in a structured or hierarchical manner.

BACKGROUND OF THE INVENTION

Today, there are numerous situations in which digital content items (e.g., files, text, graphics, etc.) are arranged in a structured or hierarchical manner. For example, file directories provide a hierarchical structure in which files are organized. In a typical file directory viewing program, upon receiving a selection of a particular directory of the file directory, files and sub-directories of the selected directory are typically displayed on a user interface. A user may then either select a displayed file or select a displayed sub-directory. If a displayed sub-directory is selected, files and sub-directories of the selected sub-directory are typically displayed on a user interface. In this manner, a user may search through various layers a file directory that organizes files in a hierarchical structure.

Many other hierarchical structures exist for organizing digital content items. In the context of a business directory, for example, business names are arranged by categories and often, also by sub-categories. Examples of business categories include banks, hotels, restaurants, and the like. As an example of sub-categories, the restaurant category, may have sub-categories of Chinese restaurants, Italian restaurants, and the like. In this manner, business names may be organized into the hierarchical structure in a logical manner, allowing a user to more easily locate a desired business name.

Despite improvements in software, the presentation of structured digital content items is still a very time consuming process. For example, to view digital content to items in an advertisement compilation such as an electronic Yellow Pages telephone directory, a user may navigate through a series of complex screens and drop-down menus to find and view a particular advertisement. Alternatively, a user may search on particular keywords and then scroll through the search results to view a particular advertisement. This may take a multitude of keystrokes until the desired advertisement is found.

Further, with conventional systems and methods, the order of displaying categories and digital content items remains constant. That is, each time a user navigates through the series of complex screens and drop-down menus, the same ordering of categories and digital content items is used. Therefore, even if a user typically searches for and selects Italian restaurants, the user may have to spend a long time searching through the entire list of restaurant categories before reaching the Italian restaurant category. Each time the user searches for a particular category or digital content item, the user searches through the entire list of categories or digital content items in their original order.

In view of the foregoing, there is a need for a system and method for rapid presentation of structured content.

SUMMARY OF THE PRESENT INVENTION

The present invention is directed to the rapid presentation of structured digital content items using a pointing device to quickly view categories and digital content items within the categories.

According to one aspect of the present invention, a structure file defines a hierarchical structure and a plurality of content files each define a set of digital content items. Each content file can be related to a position within the hierarchical structure, thereby organizing the digital content items into the hierarchical structure. To present categories and digital content items rapidly, categories are read from the structure file and sets of digital content items are read from each content file. The categories are mapped to areas on a display. Continuously, a location on the display is received via a pointing device and a category corresponding to the received location is displayed. Further, a selection of a location on the display is received. The selection corresponds to a particular category based on the mapped areas. The content files corresponding to the particular category are read and mapped to areas on the display. Continuously, a location on the display is received via a pointing device and the digital content items corresponding to the content file mapped to that location are displayed.

According to another aspect of the present invention, user preferences are stored and used to intelligently display categories and sets of digital content items. A user selection of a category or digital content items is received and stored. The selection may be stored in the structure file, one of the content files, a preference file, or the like. The selection may be stored in the form of a counter that indicates how many times a category or set of digital content items has been selected. In this manner, categories and sets of digital content items may be prioritized based on a number of selections. Alternatively, the selection may be stored in the form of a user name and selection time. In this manner, categories and sets of digital content may be prioritized based on a user and a time.

The above-listed features, as well as other features, of the present invention will be more fully set forth hereinafter.

BRIEF DESCRIPTION OF THE DRAWINGS

The present invention is further described in the detailed description that follows, by reference to the noted plurality of drawings by way of non-limiting illustrative embodiments of the present invention, in which like reference numerals represent similar parts throughout the several views of the drawings, and wherein.

DETAILED DESCRIPTION OF THE ILLUSTRATIVE EMBODIMENTS

The present invention is directed to the rapid presentation of structured digital content items using a pointing device to quickly view categories and digital content items within the categories.

Figure 1:
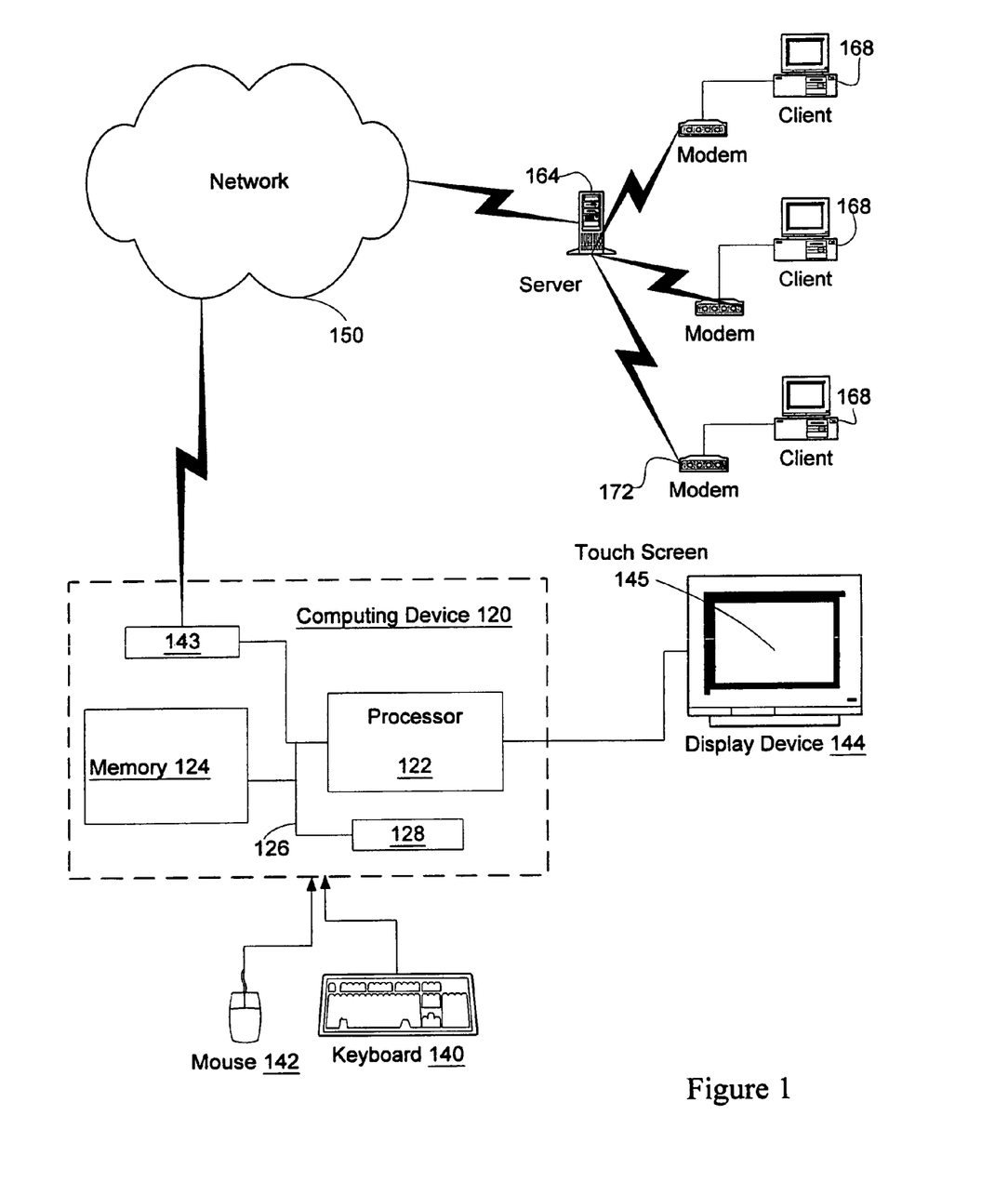
FIG. 1 is a block diagram of an exemplary computing device and communications network with which the present invention may be employed.

FIG. 1 is a block diagram of a generic computing system with which the present invention may be employed. As shown in FIG. 1, computing device 120 includes processor 122, system memory 124, and system bus 126 that couples various system components including system memory 124 to processor 122. System memory 124 may include read-only memory (ROM) and/or random access memory (RAM). Computing device 120 may further include hard-drive 128, which provides storage for computer readable instructions, data structures, program modules, data, and the like. A user (not shown) may enter commands and information into the computing device 120 through input devices such as a keyboard 140 and/or a mouse 142. A display device 144, such as a monitor, a flat panel display, or the like is also connected to the computing device 120 for output. Display device 144 includes touch screen 145. Display device 144 may also include other pointing devices such as a light pen, a grid of light beams, or the like for inputting information into processor 122. Communications device 143, which in one embodiment is a modem, provides for communications over network 150. Processor 122 can be programmed with instructions to interact with other computing systems so as to perform the techniques described below. The instructions may be received from network 150 or stored in memory 124 and/or hard drive 128. Processor 122 may be loaded with any one of several computer operating systems such as WINDOWS NT operating system, WINDOWS 2000 operating system, LINUX operating system, and the like.

As shown in FIG. 1, computing device 120 may be connected to computer network 150. Server 164 is operable to communicate with other computing devices over network 150. Network 150 may be the Internet, a local area network, a wide area network, or the like. Server 164 may communicate e-mails, web pages, and other data. Server 164 may be operated by an ISP, a corporate computer department, or any other organization or person with a server connected to network 150. Server 164 is accessible by client stations 168 from which users may send and receive data and browse web pages. Client stations 168 may connect to servers via a local area network (not shown) or using a remote connection device 172 such as, for example, a modem, as is shown in connection with server 164.

Figure 2:
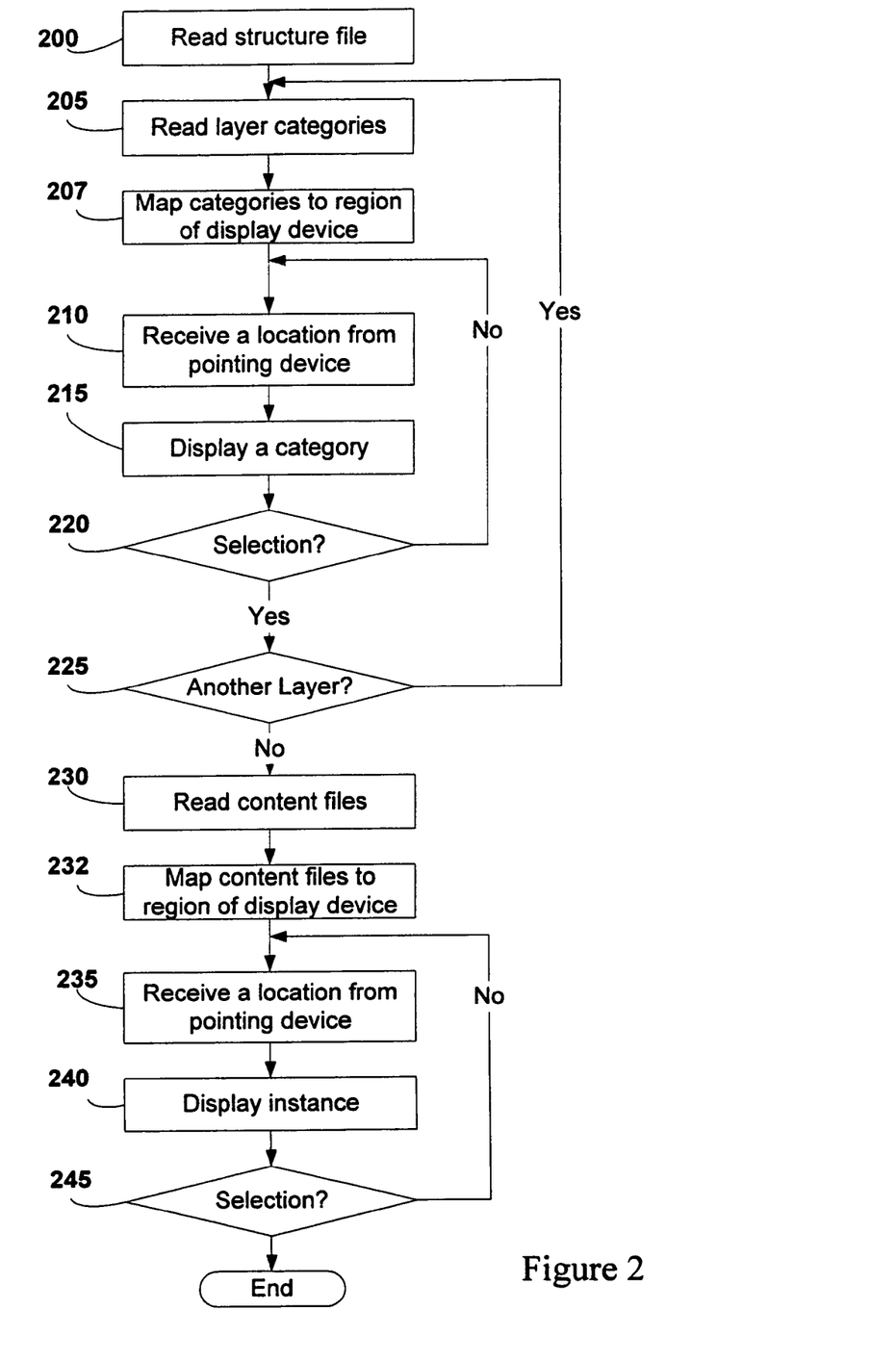
FIG. 2 is a flow diagram of a method for rapidly presenting structured digital content items, in accordance with an embodiment of the present invention.

FIG. 2 is a flow diagram of a method in accordance with one embodiment of the present invention, as applied to the computing device of FIG. 1. As shown in FIG. 2, at step 200, processor 122 reads a file referred to herein as a "structure file." The term "structure file" is defined herein as a file which defines a hierarchical structure for sets of digital content items. The structure file may be any type of file for providing structure to sets of digital content items, such as for example, a document type definition (DTD) file, an extensible markup language (XML) schema file, or the like. To illustrate, processor 122 reads a DTD file containing the following:

```
<DTDFILE> <PHONEBOOK>
  <BUSINESS CATEGORY>
    <AUTOMOBILE DEALER> </AUTOMOBILE DEALER>
    <BANK> </BANK>
```

-continued

```
    <HOTEL> </HOTEL>
    <RESTAURANT>
      <CHINESE> </CHINESE>
      <ITALIAN> </ITALIAN>
      <GREEK> </GREEK>
    </RESTAURANT>
  </BUSINESS CATEGORY>
</PHONEBOOK> </DTDFILE>
```

The above DTD file implements a structural hierarchy by grouping tags. The hierarchy is organized at a first layer by business category, which is identified by the tag BUSINESS CATEGORY. The first layer includes the following business type categories: automobile dealer, bank, hotel, and restaurant, which are identified by the tags AUTOMOBILE DEALER, BANK, HOTEL, and RESTAURANT, respectively. The restaurant category includes a second layer having sub-categories of Chinese, Italian, and Greek, which are identified by the tags CHINESE, ITALIAN, and GREEK, respectively.

In addition to the structure as described above, sets of digital content items are associated with the structure. Digital content items may include a text string, a text file, a graphical image file, an audio file, and the like. A content file may be used to group several digital content items and to relate the group or set of digital content items to the structure. The term "content file" is defined herein as a file containing a digital content item or a reference to a digital content item and a relationship to a structure file.

To explain further, a content file may contain a digital content item and/or a reference to a digital content item. For example, if the digital content item is a text string of "123-456-7890", the content file may simply contain the text string, "123-456-7890." If the digital content item is a graphical image file, for example, a .jpg file, the content file may contain the location of the file, for example, "c:/phonenumbers/1234567890.jpg." In either event, the content file allows an application to access the digital content item, either directly or indirectly.

Content files also link the set of digital content items to the structure file such that each content file can be related to the hierarchy implemented by the structure file. For example, XML files may be linked to the DTD file such that each XML file has a business category tag therein, which relates the file to a layer within the DTD file hierarchy. XML files having a business category tag of restaurant may include a restaurant sub-category tag, such as Chinese, Italian, Greek, and the like. In this manner, each content file can be related to the hierarchy implemented by the structure file, and therefore, each set of digital content items can be related to the hierarchy.

For purposes of illustration, four content files are provided below. While the content files below are illustrated as XML files, it is contemplated that the content file may be any file containing a digital content item or a reference to a digital content item and a relationship to a structure file. As shown below, each file identifies an Italian restaurant and has the appropriate XML tags to place the restaurant in the appropriate location within the hierarchy defined in the DTD file above.

The first file, referred to herein as content file A, comprises the following:

```
<XMLFILE>
<BUSINESS CATEGORY> Restaurant </ BUSINESS CATEGORY>
<RESTAURANT CATEGORY> Italian </RESTAURANT CATEGORY>
<NAME> Cousin Lou's </NAME>
<DESCRIPTION> Italian Restaurant </DESCRIPTION>
<PHONE> 123-456-7890 </PHONE>
</XMLFILE>
```

As shown, content file A includes tags identifying that the business is a restaurant and falls within the sub-category of Italian restaurants. As such, content file A can be placed in the hierarchy of the DTD file under the sub-category Italian of the category restaurant. Content file A also includes digital content items. As shown, content file A includes a text string of "Cousin Lou's" associated with the tag NAME, a text string of "Italian Restaurant" associated with the tag DESCRIPTION, and a text string of "123-456-7890" associated with the tag PHONE.

The second file, referred to herein as content file B, comprises the following:

```
<XMLFILE>
<BUSINESS CATEGORY> Restaurant </BUSINESS CATEGORY>
<RESTAURANT CATEGORY> Italian </RESTAURANT CATEGORY>
<NAME> Casa D'Amici </NAME>
<DESCRIPTION> Italian Cuisine </DESCRIPTION>
<PHONE> 987-654-3210 </PHONE>
</XMLFILE>
```

As shown, content file B includes tags identifying that the business is a restaurant and falls within the sub-category of Italian restaurants. As such, content file B can be placed in the hierarchy of the DTD file under the sub-category Italian of the category restaurant. Content file B also includes digital content items. As shown, content file B includes a text string of "Casa D'Amici" associated with the tag NAME, a text string of "Italian Cuisine" associated with the tag DESCRIPTION, and a text string of "987-654-3210" associated with the tag PHONE.

The third file, referred to herein as content file C, comprises the following:

```
<XMLFILE>
< BUSINESS CATEGORY> Restaurant </ BUSINESS CATEGORY>
<RESTAURANT CATEGORY> Italian </RESTAURANT CATEGORY>
<NAME> Dino's </NAME>
<DESCRIPTION> Bar and Grill </DESCRIPTION>
<PHONE> 456-789-0123 </PHONE>
</XMLFILE>
```

As shown, content file C includes tags identifying that the business is a restaurant and falls within the sub-category of Italian restaurants. As such, content file C can be placed in the hierarchy of the DTD file under the sub-category Italian of the category restaurant. Content file C also includes digital content items. As shown, content file C includes a text string of "Dino's" associated with the tag NAME, a text string of "Bar and Grill" associated with the tag DESCRIPTION, and a text string of "456-789-0123" associated with the tag PHONE.

The fourth file, referred to herein as content file D, comprises the following:

```
<XMLFILE>
<BUSINESS CATEGORY> Restaurant </BUSINESS CATEGORY>
<RESTAURANT CATEGORY> Italian </RESTAURANT CATEGORY>
<NAME> Poppy's </NAME>
<DESCRIPTION> Pasta Place </DESCRIPTION>
<PHONE> 111-222-3333 </PHONE>
</XMLFILE>
```

As shown, content file D includes tags identifying that the business is a restaurant and falls within the sub-category of Italian restaurants. As such, content file D can be placed in the hierarchy of the DTD file under the sub-category Italian of the category restaurant. Content file D also includes digital content items. As shown, content file D includes a text string of "Poppy's" associated with the tag NAME, a text string of "Pasta Place" associated with the tag DESCRIPTION, and a text string of "111-222-3333" associated with the tag PHONE.

Thus each of the illustrative content files A, B, C, and D, contains a business category tag set to 'restaurant' and a restaurant category tag set to 'Italian'. As such, all four content files includes tags that fall within the hierarchy defined in the illustrative structure file. Pairing the content files with the structure file allows for the rapid display of the digital content items, as described in more detail below.

Referring back to FIG. 2, at step 205, processor 122 reads the categories of the first layer from the structure file. In the context of the illustrative embodiment, processor 122 reads four business categories, automobile dealer, bank, hotel, and restaurant from the DTD file At step 207, processor 122 maps each category to an area of display device 144. In this illustration, since there are four categories, processor 122 divides the display device 144 into four regions by dividing the maximum number of x-pixels on display device 144 by two and the maximum number of y-pixels by two to obtain threshold values. For example, for a 800-x-pixel by 600-y-pixel display, the 800-x-pixels are divided by two, resulting in a threshold value of four hundred and the 600-y-pixels are divided by two, resulting in a threshold value of three hundred. These threshold values divide display device 144 into regions, or quadrants in the case of four categories, and each region is associated with a category. In this manner, processor 122 maps from a pointer location to a selected category based upon the threshold values and the pointer location.

Alternatively, if the number of categories or content files is very large, the categories or content files may be mapped to a pixel location rather than an area of the display device. To implement this mapping, a single number can be derived from the x-pointer and y-pointer location according to x-pixel-location+(y-pixel-location*maximum-x-pixels) and each derived number may then be mapped to a corresponding category or content file.

The mapping of the categories to a particular region may be based upon any number of criteria including a predefined order of category names, an alphabetical ordering of the category names, or the like. Alternatively, the mapping may be performed based on a stored user preference, as described in more detail below.

At step 210, processor 122 receives an x-coordinate and a y-coordinate corresponding to a location on display device 144. The x, y-coordinate pair is defined by a pointing device which may be a mouse 142, a touch screen, a light pen, or other pointing device.

Figure 3A:
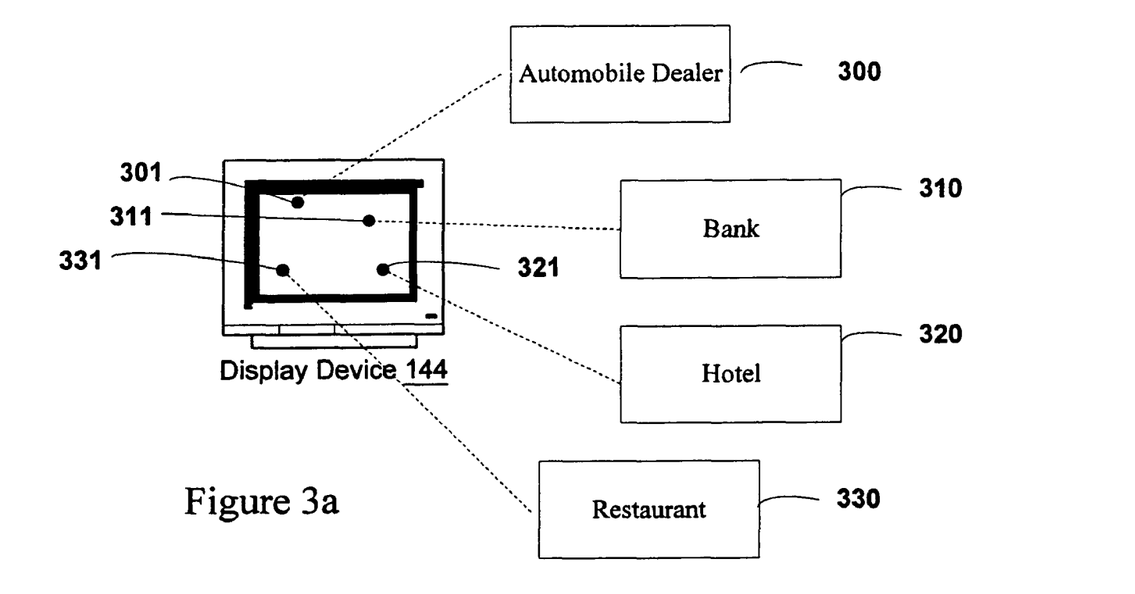
FIGS. 3a and 3b are illustrations of the operation of an embodiment of the present invention.

At step 215, processor 122 causes a category to be displayed on display device 144 corresponding to the location received from the pointing device. The category may be displayed as a display instance. A display instance is defined herein as digital information in a format which may be sent to a display device for displaying. The display instance may contain, for example, plain text and/or a graphical bitmap. In either case, the category is displayed on display device 144. FIG. 3a provides an illustration of the category display instances that are displayed as a result of the DTD file specified above. As shown in FIG. 3a, processor 122 displays instance 300, "Automobile Dealer," in response to receiving location 301 from the pointing device. Processor 122 displays instance 310, "Bank," in response to receiving location 311 from the pointing device. Processor 122 displays instance 320, "Hotel," in response to receiving location 321 from the pointing device. Processor 122 displays instance 330, "Restaurant," in response to receiving location 331 from the pointing device.

A style definition may be applied to the category name for creating and displaying the instance. For example, an extensible style language (XSL) file may be applied to the category name, such that the category name is displayed in bold font style, in italic font style, in 12 point font size, and the like. In this manner, the display instance may be made more appealing.

Referring back to FIG. 2, at step 220, processor 122 determines if a selection is received from the pointing device. If a selection is received, the currently displayed category is the selected category and the processing proceeds to step 225. If a selection is not received, processor 122 returns to step 210 to receive another pointer location and to display another category instance. Processor 122 continually returns to step 210 until a selection is received or processing is otherwise halted.

At step 225, processor 122 determines if there is another layer of the hierarchy below the selected category as defined by the structure file. If there is no layer below the selected category, processor 122 proceeds to step 230, described below. If there is a layer below the selected category, processor 122 performs steps 205 through 220 again with respect to the layer below the selected category (i.e., a layer containing sub-categories). For example, if the selected category is restaurant, processor 122 proceeds back to step 205 and reads from the structure file, the sub-categories in the layer below restaurant. As defined in the illustrative structure file, the layer below restaurant includes three sub-categories: Chinese, Italian, and Greek. At this point, processor 122 proceeds again through steps 210 through 220 and determines if a sub-category has been selected.

At step 230, processor 122 reads a set of digital content items corresponding to the selected category. Particularly, processor 122 reads each set of digital content items that is mapped to the selected category. This might be accomplished, for example, by reading the content files for the selected sub-category. In the context of the illustrative structure file, if the selected category is sub-category Italian restaurant, processor 122 reads sets of digital content items corresponding to the sub-category Italian restaurant. Particularly, in the example, processor 122 reads the four content files A, B, C, and D described above, since all four files have a business category of restaurant and a restaurant sub-category of Italian.

In the present embodiment, at step 230, processor 122 also creates a display instance for each set of digital content items in advance of proceeding to the next step. By creating the display instances all at once, processor 122 is efficiently utilized and the user may quickly view many different display instances. That is, while the user is proceeding to the next step, processor 122 is already creating the display instances that will be used in the next step. Therefore, once the user begins using the pointing device to view display instances, the display instances need only be sent to the display rather than being created and then being sent to the display. However, due to computing limitations of computing device 120 or other design concerns, processor 122 may alternatively create only one display instance at a time in response to a received pointer location.

According to another implementation, processor 122 may begin creating display instances and proceed to step 235 while concurrently completing the creation of the remaining instances. In this implementation, the user will not be delayed from proceeding to the next step; however, some display instances may be slower to appear on the display device. This implementation may be preferred in some cases due to computing limitations of computing device 120 or other design concerns. For example, this implementation may be preferred if content files are being read from network 150.

In yet another implementation, the display instances are created beforehand by processor 122 or another processor, for example, accessible over network 150 and are mapped to the content files.

At step 232, processor 122 maps each set of digital content items to an area of display device 144. In this example, since there are four content files (i.e., four XML files corresponding to the selected category), processor 122 divides display device 144 into four regions by dividing the maximum number of x-pixels on display device 144 by two and the maximum number of y-pixels by two to obtain threshold values. These threshold values divide display device 144 into regions and each region is associated with a set of digital content items. In this manner, processor 122 maps from a pointer location to a set of digital content items based upon the threshold values and the pointer location. Processor 122 may also map each set of digital content items to pixel location as described above in step 207.

The mapping of the sets of digital content items to a particular region may be based upon any number of criteria including a predefined order of content files, an alphabetical ordering of the content files, or the like. Alternatively, the mapping may be performed based on a stored user preference, as described in more detail below.

Figure 3B:
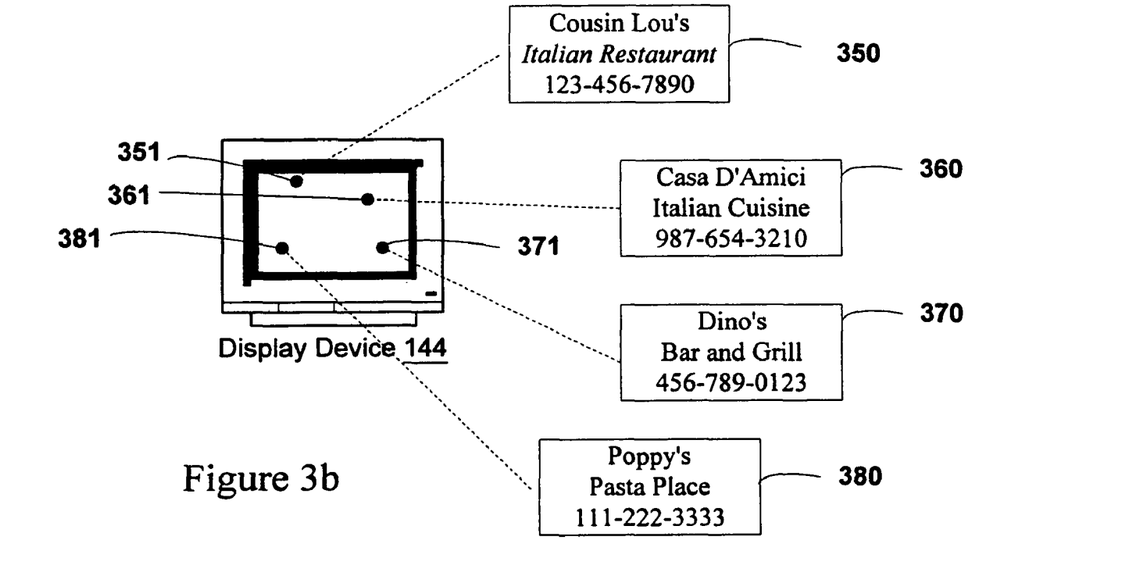

At step 235, processor 122 receives an x-coordinate and a y-coordinate corresponding to a location on display device 144. At step 240, processor 122 causes a set of digital content items to be displayed on display device 144. The set of digital content items is based upon the received location from the pointing device. The set of digital content items may be displayed as a display instance. FIG. 3b provides an illustrative example of display instances that may be displayed as a consequence of the content files described above. As shown in FIG. 3b, processor 122 displays instance 350, which corresponds to content file A, in response to receiving location 351 from the pointing device. Processor 122 displays instance 360, which corresponds to content file B, in response to receiving location 361 from the pointing device. Processor 122 displays instance 370, which corresponds to content file C, in response to receiving location 371 from the pointing device. Processor 122 displays instance 380, which corresponds to content file D, in response to receiving location 381 from the pointing device.

A style may also be applied to each digital content item for displaying the display instance. For example, an XSL file may be applied to each XML file, thereby creating a display instance for each digital content item. The XSL file may apply bold font style, italic font style, 12 point font size, or any other stylistic feature to each XML file. In this manner, the display instances may be made more appealing. As shown, an italic font style is applied to the description of display instance 350. XSL files may be predetermined and stored on hard drive 128, memory 124, server 164, or the like.

A content file may contain a graphic file or a reference to a graphic file. If so, processor 122 reads the graphic file and creates a display instance containing a graphic image corresponding to the graphic file. In this manner, the display instance may contain graphic images, which may make the advertisement more appealing to a user.

Referring again to FIG. 2, at step 245, processor 122 determines if a selection is received from the pointing device. If a selection is received, the currently displayed set of digital content items is the selected set of digital content items and the processing ends. If a selection is not received, processor 122 returns to step 235 to receive another pointer location and to display another display instance. Once a set of digital content items is selected, processor 122 marks the set as selected and may perform further processing, as described in more detail below. A selection may be a release from a touch screen, a click of a mouse button, or the like.

Figure 4A:
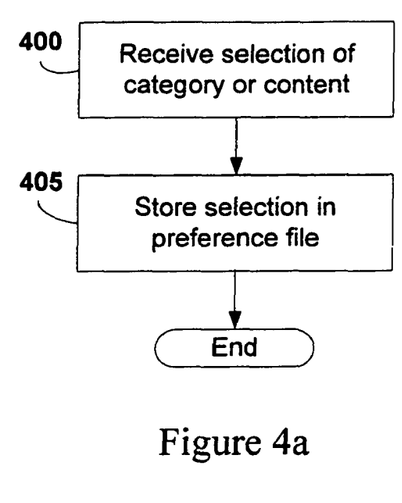
FIGS. 4a through 4b are flow diagrams of methods for rapidly presenting structured digital content items based on user preferences, in accordance with an embodiment of the present invention.

According to another embodiment of the present invention, a user's preferences may be stored and used in displaying categories and digital content items. FIG. 4a is a flow diagram of a method for storing user preferences for viewing digital content items. As shown in FIG. 4a, at step 400, processor receives a selection of a category or a set of digital content items, as described in step 220 or 245 above. At step 405, processor 122 stores an indication corresponding to the selected category or set of digital content items.

Processor 122 may store the indication in a "preference file." In the case that a category is selected, processor 122 creates an entry in a preference file identifying that the user has selected a particular category. Each time the category is subsequently selected, processor 122 increments a counter of the number of times that the particular category has been selected. For example, if a user has selected the restaurant category, processor 122 creates an entry that the restaurant category was selected. If the restaurant category is selected again, processor 122 increments the counter to identify that the restaurant category has been selected twice. Each time a user selects a category, processor 122 stores more information about the user's preferences. As such, processor 122 becomes more intelligent regarding the preferences of the user and may make the user's interactions with the processor more efficient. The file in which the preference data is stored, the "preference file," may be a text file, a spreadsheet, or any file containing information representing a category and a counter of the number of times a category is selected. The preference file may be stored on hard drive 128, on server 164, or the like. If the preference file is stored on server 164, the preference file is named such that it may be related to a particular user. In this manner, the preferences of multiple users may be maintained, and thus, the preferences of one user may be distinguished from the preferences of other users.

In an alternative implementation, user preferences are stored in the structure and/or content files. For example, in the structure file described above, if a user selects the Italian restaurant category, processor 122 may store the following entry in the structure file:

```
<RESTAURANT>
    <CHINESE> </CHINESE>
    <ITALIAN> </ITALIAN>
<USER#1 SELECTED 051001AM0804> YES </USER#1 SELECTED 51001AM0804>
    <GREEK> </GREEK>
```

As shown, an entry is stored in the DTD file that stores a user identification and a selection date and time. The structure file may be stored as one structure file containing the selections of multiple users or as one structure file for each user. In this manner, the preferences of one user may be distinguished from the preferences of other users.

With respect to storing user preferences for sets of content items, the entry may be stored directly in the content file. For example, in content file B described above, if a user selects Dino's, processor 122 may store the following entry in the content file:

```
<NAME> Dino's </NAME>
    <DESCRIPTION> Bar and Grill </DESCRIPTION>
<USER#1 SELECTED 051001AM0804> YES </USER#1 SELECTED 51001AM0804>
```

As shown, a line is stored in the XML file that stores a user identification and a selection date and time. The content file may be stored as one content file containing the selections of multiple users or as one content file for each user. In this manner, the preferences of one user may be distinguished from the preferences of other users.

Figure 4B:
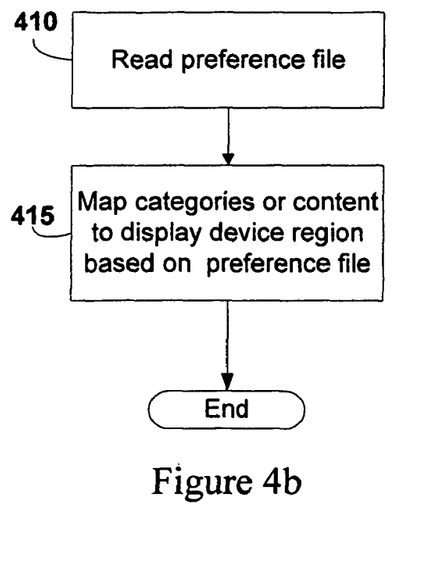

Thus, using either separate preference files or entries in the structure and/or content files, user preferences are stored and employed during the mapping process to make the system more user friendly. FIG. 4b provides a flow chart of a process for mapping structure and content using user preference data. Referring to FIG. 4b, at step 410, to display a category or a set of digital content items, processor 122 reads the user's preferences. At step 415, the categories or sets of digital content items are mapped to a region of display device 144 based on the user preferences. In particular, categories or sets of digital content items that have previously been selected by the user are mapped to a particular region of display device 144. For example, categories that have previously been selected may be mapped to the upper right hand region of display device 144. In this manner, a user may point to the upper right hand region and view categories that have been previously selected. Processor 122 may also use the date and time of the stored selection to map from categories or sets of digital content items to a region of display device 144. For example, processor 122 may only map a category to a particular region if the category has been selected within a predefined amount of time. Employing these preferences, a user can quickly locate items that were previously selected.

Thus, there has been described a system and method for rapidly presenting structured digital content items using a pointing device to quickly preview categories and digital content items. The user may quickly preview many display instances of structured digital content items without having to navigate through a series of drop down menus. In this manner, a user may search through structured digital content items very quickly and very simply. It is not required to maneuver through a multiplicity of drop-down menus via multiple keystrokes; rather, a user simply uses a touch screen or a mouse to quickly scroll through structured digital content items. By making a selection (e.g., by releasing a finger from a touch screen or clicking the mouse), the user may move down one layer in the hierarchy implemented by the structure file or may select a desired set of digital content items. Moreover, a user's preferences may be stored and used in displaying categories and digital content items. As such, the user may access the desired category or content very quickly.

The present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of explanation and are in no way to be construed as limiting of the present invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A method for presenting structured digital content items, comprising:
   reading a file having a hierarchical structure and one or more categories of content items;
   dividing a display area into regions and mapping the one or more categories of content items to areas on the display such that each category of content items maps to a unique, particular region in the display;
   receiving a selection of a content item in a category of content items;
   storing a username associated with the selection and a time of the selection;
   receiving an x-coordinate and a y-coordinate corresponding to a location on the display of the selection;
   displaying the category of content items that maps to the x-coordinate and the y-coordinate; and
   associating the x-coordinate, the y-coordinate, and the category to the username.

2. The method of claim 1, further comprising dividing the display area into new regions according to how many content items are associated with the category.

3. The method of claim 1, further comprising mapping each content item to a particular new region.

4. The method of claim 1, further comprising determining whether the location has been selected.

5. The method of claim 4, further comprising determining whether the category that maps to the x-coordinate and the y-coordinate is associated with a lower layer of the hierarchical structure.

6. The method of claim 5, further comprising reading information from a content item associated with the category when the category is unassociated with the lower layer of the hierarchical structure.

7. The method of claim 6, further comprising displaying the content item.

8. The method of claim 5, wherein when the category is associated with the lower layer of the hierarchical structure, then further comprising dividing the display area into new regions and mapping subcategories of content items to new areas on the display such that each subcategory maps to another unique, particular region in the display.

9. The method of claim 8, further comprising receiving a new x-coordinate and a new y-coordinate that corresponds to a new location on the display.

10. The method of claim 9, further comprising displaying a subcategory of content items that maps to the new x-coordinate and the new y-coordinate.

11. The method of claim 9, further comprising determining whether the subcategory that maps to the new x-coordinate and the new y-coordinate is associated with another lower layer of the hierarchical structure.

12. The method of claim 11, further comprising reading information from a content item associated with the subcategory when the subcategory is unassociated with the another lower layer of the hierarchical structure.

13. The method of claim 12, further comprising receiving a selection of the content item associated with the subcategory.

14. The method of claim 13, further comprising displaying the content item associated with the subcategory.

15. The method of claim 11, further comprising associating the x-coordinate, the y-coordinate, the category, the new x-coordinate, the new y-coordinate, and the subcategory to the username.

16. The method of claim 1, further comprising receiving a selection of a content item in the category of content items.

17. The method of claim 1, further comprising prioritizing the displaying of the content items according to the username and the time.

18. A system, comprising:
   a processor and memory, the processor communicating with the memory,
   the processor reading a first file having a hierarchical structure and one or more categories of content items,
   the processor dividing a display area into regions and mapping the one or more categories of content items to areas on the display such that each category maps to a unique, particular region in the display,
   the processor receiving a selection of a content item in a category of content items and storing a username associated with the selection and a time of the selection,
   the processor receiving an x-coordinate and a y-coordinate corresponding to a location on the display of the selection,
   the processor displaying the category of content items that maps to the x-coordinate and the y-coordinate, and
   the processor associating the x-coordinate, the y-coordinate, and the category to the username.

19. A computer-readable medium having instructions stored thereon that, when executed on a processor, cause the processor to perform a method, the method comprising:
- reading a file having a hierarchical structure and one or more categories of content items;
- dividing a display area into regions and mapping the one or more categories of content items to areas on the display such that each category of content items maps to a unique, particular region in the display;
- receiving a selection of a content item in a category of content items;
- storing a username associated with the selection and a time of the selection;
- receiving an x-coordinate and a y-coordinate corresponding to a location on the display of the selection;
- displaying the category of content items that maps to the x-coordinate and the y-coordinate;
- associating the x-coordinate, the y-coordinate, and the category to the username;
- receiving a new x-coordinate and a new y-coordinate that corresponds to a new location on the display;
- displaying a subcategory of content items that maps to the new x-coordinate and the new y-coordinate;
- determining whether the subcategory that maps to the new x-coordinate and the new y-coordinate is associated with another lower layer of the hierarchical structure;
- reading information from a content item associated with the subcategory when the subcategory is unassociated with the another lower layer of the hierarchical structure;
- receiving a selection of the content item associated with the subcategory;
- prioritizing the displaying of the content items according to the username and the time; and
- associating the x-coordinate, the y-coordinate, the category, the new x-coordinate, the new y-coordinate, and the subcategory to the username.

* * * * *